United States Patent [19]

Akama et al.

[11] Patent Number: 4,677,561

[45] Date of Patent: Jun. 30, 1987

[54] AUTOMOTIVE NAVIGATION SYSTEM

[75] Inventors: Yasuyuki Akama; Ikuo Musa; Kouichi Taketoshi, all of Himeji, Japan

[73] Assignee: Mitsubishi Denki Kabushiki Kaisha, Japan

[21] Appl. No.: 726,766

[22] Filed: Apr. 24, 1985

[30] Foreign Application Priority Data

Apr. 28, 1984 [JP] Japan ................................. 59-86867

[51] Int. Cl.$^4$ ........................................ G06F 15/50
[52] U.S. Cl. .................................... 364/449; 364/521; 340/988; 340/995; 73/178 R
[58] Field of Search ............... 364/443, 449, 460, 521; 340/988, 995; 343/451; 73/178 R; 342/451

[56] References Cited

U.S. PATENT DOCUMENTS

| | | | |
|---|---|---|---|
| 4,513,377 | 4/1985 | Hasebe et al. | 364/521 |
| 4,535,335 | 8/1985 | Tagami et al. | 340/995 |
| 4,543,572 | 9/1985 | Tanaka et al. | 340/995 |
| 4,571,684 | 2/1986 | Takanabe et al. | 340/995 |

OTHER PUBLICATIONS

"Cathode-Ray Tube Information Center with Automotive Navigation" by M. W. Jarvis and R. C. Berry.
"On-Board Computer System for Navigation, Orientation, and Route Optimization" by P. Haeussermann.

Primary Examiner—Gary Chin
Attorney, Agent, or Firm—Leydig, Voit & Mayer

[57] ABSTRACT

An automotive navigation system wherein a memory included therein has not stored therein picture information of an actual map, but instead has stored therein geographical names and the geographical positions thereof. When the geographical names of a departure point, a destination point and one or more passing points are entered through an input unit, a control circuit reads out the respective positions of the points from the memory. The control circuit controls a display unit to display on a display screen marks respectively indicating two or more of the points and the current position of a vehicle.

14 Claims, 32 Drawing Figures

FIG. 5
"Kana" TABLE

| | 41a1 | 41a2 | 41a3 | 41a4 | 415 | DEFINITION OF SOUND |
|---|---|---|---|---|---|---|
| 41a | A | I | U | E | O | CLEAR SOUND |
| 41b | KA | KI | KU | KE | KO | CLEAR SOUND |
| 41c | SA | SHI | SU | SE | SO | CLEAR SOUND |
| 41d | TA | CHI | TSU | TE | TO | CLEAR SOUND |
| 41e | NA | NI | NU | NE | NO | CLEAR SOUND |
| 41f | HA | HI | FU | HE | HO | CLEAR SOUND |
| 41g | MA | MI | MU | ME | MO | CLEAR SOUND |
| 41h | YA | | YU | | YO | CLEAR SOUND |
| 41i | RA | RI | RU | RE | RO | CLEAR SOUND |
| 41j | WA | | | | | CLEAR SOUND |
| 41ℓ | (GA) | (GI) | (GU) | (GE) | (GO) | VOICED SOUND |
| 41m | ZA | JI | ZU | ZE | ZO | VOICED SOUND |
| 41n | DA | JI | ZU | DE | DO | VOICED SOUND |
| 41o | BA | BI | BU | BE | BO | VOICED SOUND |
| | PA | PI | PU | PE | PO | SEMI-VOICED SOUND |
| 41p | KYA | | KYU | | KYO | CONTRACTED SOUND |
| 41q | SHA | | SHU | SHE | SHO | CONTRACTED SOUND |
| 41r | CHA | | CHU | CHE | CHO | CONTRACTED SOUND |
| 41s | NYA | | NYU | | NYO | CONTRACTED SOUND |
| 41t | HYA | | HYU FYU | | HYO | CONTRACTED SOUND |
| 41u | MYA | | MYU | | MYO | CONTRACTED SOUND |
| 41v | RYA | | RYU | | RYO | CONTRACTED SOUND |
| 41x | GYA | | GYU | | GYO | VOICED CONTRACTED SOUND |
| 41y | JA | | JU | JE | JO | VOICED CONTRACTED SOUND |
| 41z | BYA | | BYU | | BYO | VOICED CONTRACTED SOUND |
| 41zz | PYA | | PYU | | PYO | SEMI-VOICED CONTRACTED SOUND |
| 41k | N | | | | | |

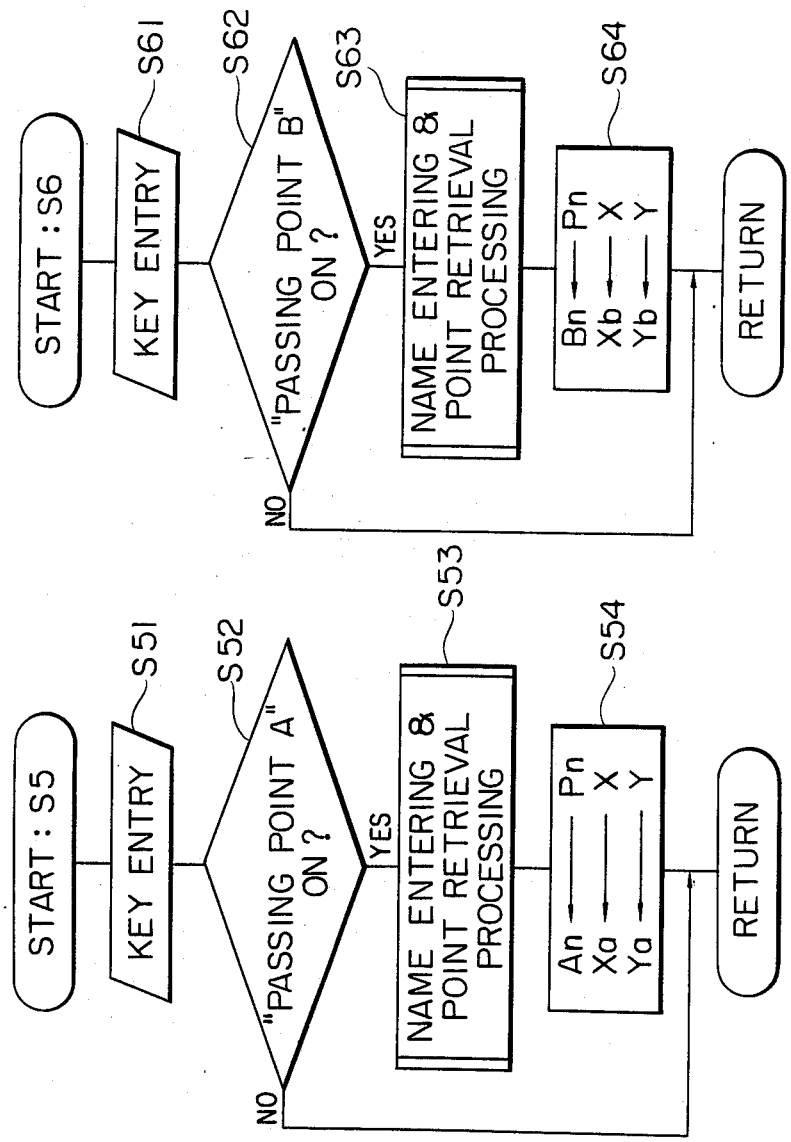

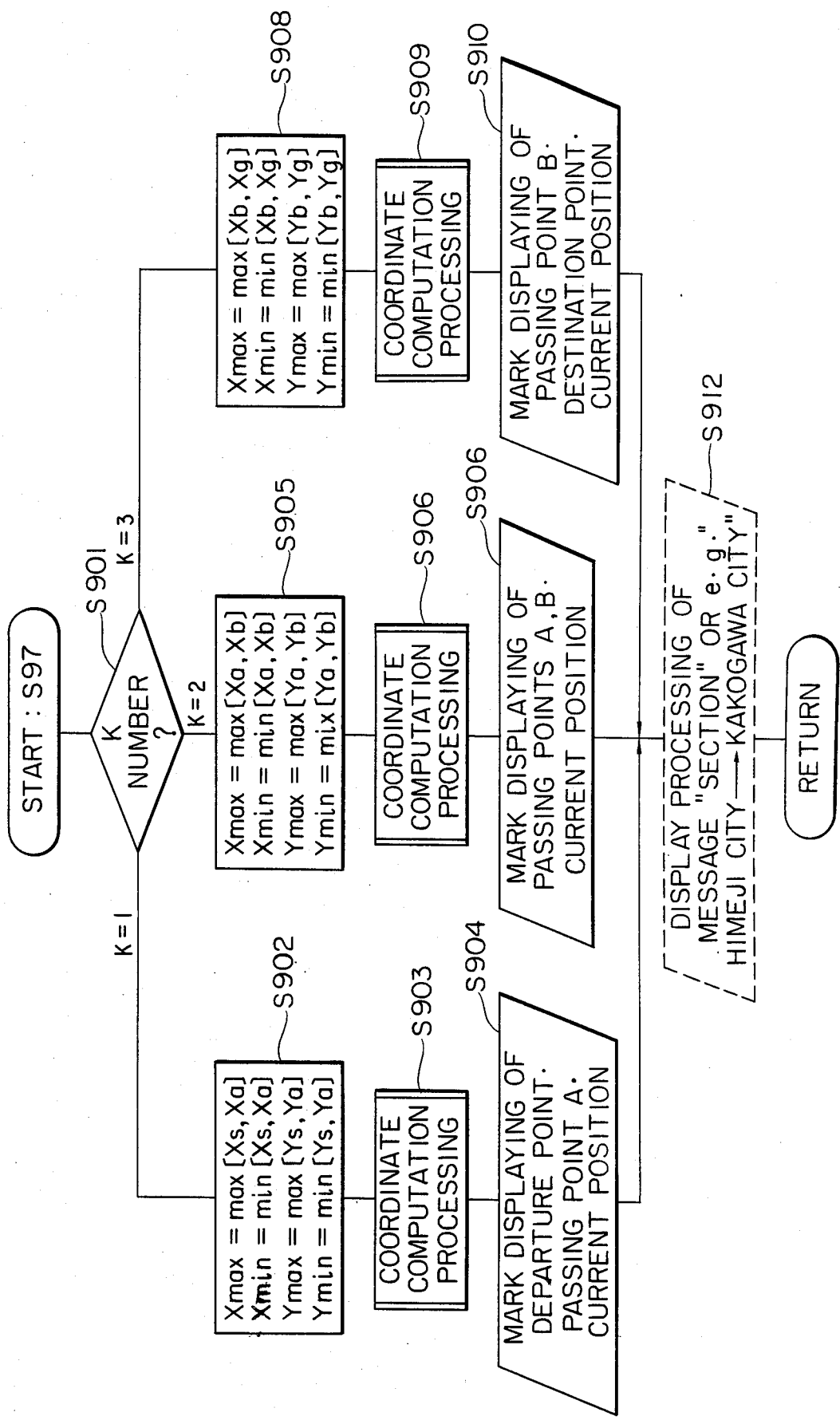

AUTOMOTIVE NAVIGATION SYSTEM

BACKGROUND OF THE INVENTION

This invention relates to an automotive navigation system, and in particular to an automotive navigation system wherein a departure point, a destination point, and the current point of a vehicle are displayed with respective marks on a display such as a cathode ray tube.

Such an automotive navigation system has been already proposed in Japanese Patent Application Laid-open No. 58-146814. This conventional system detects the running distance and the heading of a vehicle and computes the current position of the vehicle from those information. This system also displays a map as picture information read out from a memory on the display such as a CRT while displaying the mark indicating the current position of the vehicle which is computed on the display, whereby a driver can determine the current position of the vehicle from the map and the mark imaged on the display.

However, since an extremely numerous amount of information is required to display the picture information as a map, a storage means for storing such amount of information and therefore a navigation system per se must be correspondingly large-scaled and expensive. Accordingly, it is desirable to develop a small-sized and cheap navigation system suitable for boarding it on a vehicle.

In a case where a departure point and a destination point are predetermined, even though a map stored in the memory is displayed on the display and a mark indicating the current position of the vehicle is displayed in a superposed manner, the map to be displayed on a reduced scale is in certain conditions so small that the current position of a vehicle can not be clearly displayed. Furthermore, if the distance between the departure point and the destination point is far so as to require a plurality of sequencial maps, it is very hard and cumbersome to grasp the entire running route.

Although it is not necessarily impossible to solve these technical problems with a memory having a large capacity as well as a high speed arithmetic device, the size of the whole system becomes very large so that it is difficult to board the same on the vehicle.

On the other hand, there have been disclosed, "Cathode-Ray Tube Information Center with Automotive Navigation" published in SAE Technical Paper Series 840313 by M. W. Jarvis and R. C. Berry, and "On-Board Computer System for Navigation, Orientation, and Route Optimization" published in SAE Technical Paper Series 840485 by P. Haeussermann. Both publications are based on an international Congress & Exposition held in Detroit, Mich. on Feb. 27–Mar. 2, 1984. In the former literature, an approximate position of a vehicle is determined from the communication with a satellite, and a more accurate position is determined and displayed on the CRT by means of a self-contained navigation using an earth magnetism sensor in the vehicle. The latter literature discloses a composite system of a route guide system in trunk (main) highways using distance information and a destination indicating system within a city using distance information and heading information.

SUMMARY OF THE INVENTION

It is accordingly an object of the present invention to provide an automotive navigation system wherein a memory included therein has not stored therein picture information of an actual map, but instead has stored therein geographical names and the geographical positions thereof. When the geographical names of a departure point, a destination point and one or more passing points are entered through an input unit, a control circuit reads out the respective positions of the points from the memory. The control circuit controls a display unit to display on a display screen marks respectively indicating either two or more of the points and the current position of a vehicle on an adequately reduced scale. This arrangement of an automotive navigation system can perform a fully practical navigation function even with a small sized cheap memory and arithmetic unit.

In order to accomplish this object, an automotive navigation system according to this invention, broadly, comprises a running distance detecting means for detecting the running distance of a vehicle; a vehicle heading detecting means for detecting the heading of the vehicle; a display means for enabling a planar display based on the two dimensional Cartesian coordinates system; storage means for storing information comprising a geographical name and the positional information thereof for each of a plurality of points; and a control means for designating the geographical names of a departure point, a destination point, and at least one passing point along the path of the vehicle, reading out the positional information from the storage means of the designated geographical names, and receiving signals from the running distance detecting means and the heading detecting means. This control means further including means for computing coordinates on the display means of marks indicative of two or more of the departure, destination, and passing points and the current position of the vehicle on the basis of their mutual positional relationship and in a reduced scale determined by said two or more points, respectively, and controlling the display means to display said marks at the computed coordinates.

The control means preferably comprises a current position computing means for computing the current position of the vehicle from the running distance detected by the running distance detecting means and the vehicle heading detected by the vehicled detecting means; a current position initializing means for initializing the current position of the vehicle for the current position computing means; a point setting means for entering the geographical names of the departure point, the destination point, and the passing point or points of the vehicle, for retrieving the geographical names from the storage means, for reading out positional information corresponding to the geographical names, and for setting the positional information as the positions of the points; an all-points display control means for controlling the display means to display marks indicative of the respective positions of all of the points set by the point setting means and to display a mark indicative of the current position of the vehicle in a reduced scale determined by all of the points; a section setting means for selecting a section defined by less than of all of the points; a sectional display control means for controlling the display means to display marks indicative of the respective positions of selected points defining the selected section and to display a mark indicative of the current position of the vehicle in a reduced scale determined by the selected points; and a display changeover means for selectively connecting one of the all-points display control means and the section display control means to the display means.

The all-points display control means preferably includes means for controlling the display means to display two of the marks indicative of two of all of the set points on the outer periphery of a rectangular zone as imaginarily provided on the screen of the display means. The sectional display control means preferably includes means for controlling the display means to display the marks indicative of two of the selected points on the outer periphery of a rectangular zone as imaginarily provided on the screen of the display means.

The all-points display control means may further comprise means for computing coordinates on the display means of the departure, destination, and passing points and the current position of the vehicle on the basis of the mutual positional relationship therebetween, means for determining the maximum and minimum values of the positional information of all of the points entered, and means for determining the middle point between the maximum and minimum values, and means for converting the positional information to the coordinate system by rendering the middle point coincident with the central point of the screen.

The sectional display control means may further comprise means for computing coordinates on the display means of the selected points and the current position of the vehicle on the basis of the mutual positional relationship therebetween, means for determining the maximum and minimum values of the positional information of the selected points, means for determining the middle point between the maximum and minimum values, and means for converting the positional information to the coordinate system by rendering the middle point coincident with the central point of the screen.

The section setting means preferably comprises means for setting a desired section by sequentially retrieving the existing sections between the departure point and the destination point. The display changeover means preferably comprises means for entering an all-points selection and a section selection.

The all-points display control means may further comprise means for additionally displaying a message representative of all-points or means for additionally displaying a message representative of the geographical names of the departure point and the destination point. The sectional display control means may further comprise means for additionally displaying a message representative of a section or means for additionally displaying a message representative of the geographical names of both end points of the selected section.

BRIEF DESCRIPTION OF THE DRAWINGS

The present invention will be readily apparent from the embodiments illustrated in the accompanying drawings in which:

FIG. 5 shows a table of Japanese "Kana" alphabet;

Throughout the figures, the same reference numerals indicate identical or corresponding portions.

DETAILED DESCRIPTION OF THE PREFERRED EMBODIMENTS

Figure 1:
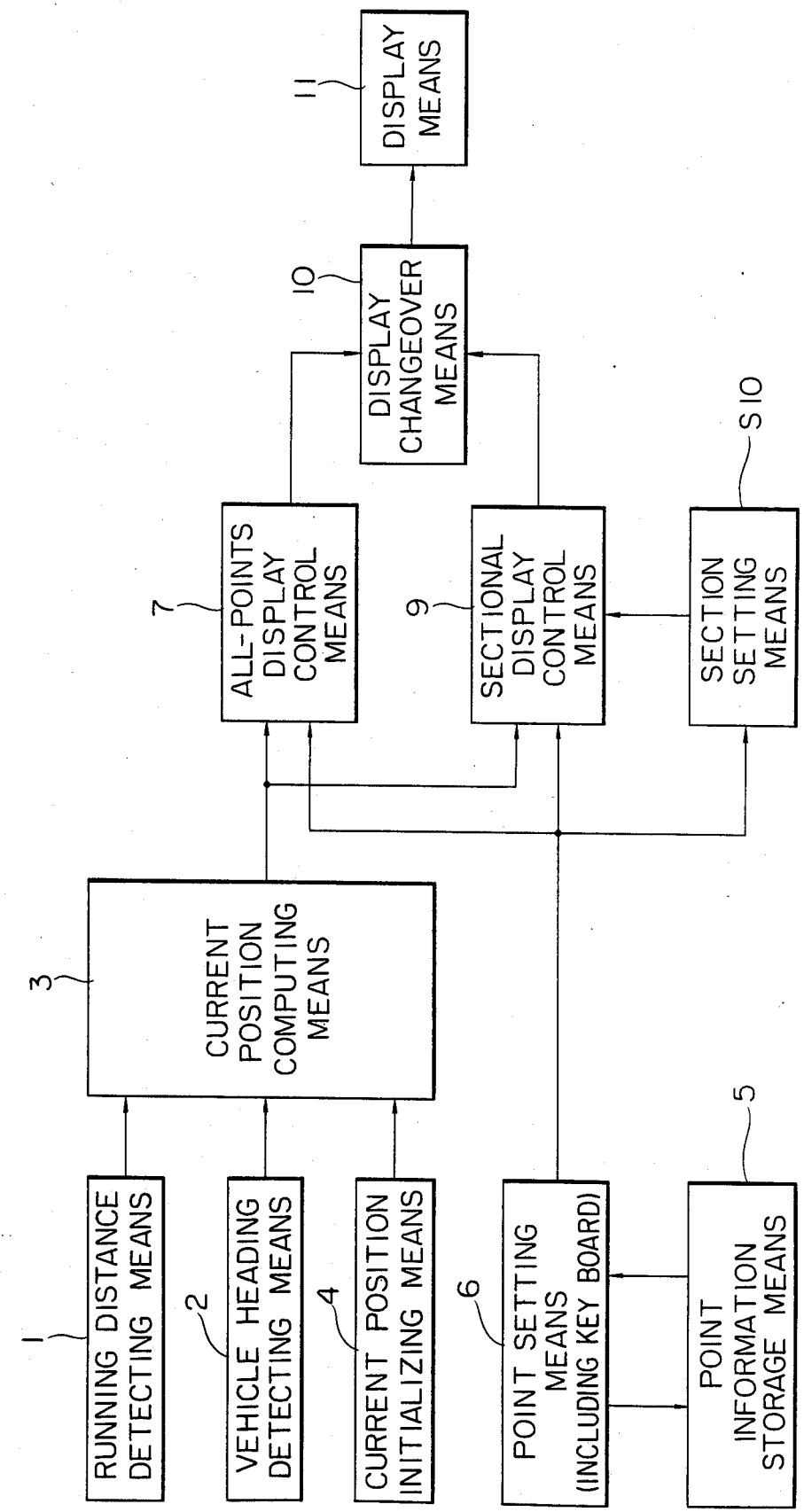
FIG. 1 shows a functional block diagram of a basic arrangement of an automotive navigation system in accordance with this invention.

Referring now to the drawings, in particular FIG. 1, there is shown one embodiment of an automotive navigation system according to this invention. This embodiment schematically shows a functional block diagram of this invention. In the figure, the outputs of a detecting means 1 for detecting the running distance of a vehicle, and a detecting means 2 for detecting the heading direction of the vehicle are connected to the inputs of a computing means 3 for computing the current position of the vehicle from the running distance provided by the detecting means 1 and the heading direction provided by the detection means 2. An initializing means 4 is provided for initially setting the current position of the vehicle for the computing means 3. A point information storage means 5 has stored therein information representative of a plurality of points each point consisting of a geographical name information and the positional information thereof. The point information storage means 5 is interconnected to a point setting means 6 which includes a key board for entering names representative of a departure (starting) point, a destination (goal) point, a passing (transit) point or passing points, namely, designates the respective geographical names of a departure point, a destination point and passing points on the way of the vehicle, reads out respective positional information corresponding to the entered geographical names from the storage means 5, and sets the positional information read out, according to the coordinates determined by the geographical names. On the basis of the mutual positional relationship between the departure point, the destination point and the passing points set by the point setting means 6, an all-points display control means 7 controls a display means 11 to display marks indicating all of the points at predetermined positions of the screen of the display means 11 and a mark indicating the current position of the vehicle on the screen on a reduced scale determined by the positions of the departure point and the destination point. A section setting means 8 serves to select two points, as desired, of the departure point, the destination point and the passing points and to set a section formed of the selected points. On the basis of the positional relationship of the two points set by the section setting means 8, a sectional display control means 9 controls the display means 11 to display the marks indicative of the points or selected by the section setting means 8 on predetermined positions of the screen of the displaying means 11 and to display the mark of the current position of the vehicle on the screen on a reduced scale determined by the positions of the selected marks. A display changeover means 10 selects one of the displaying contents of the all-points display control means 7 and the sectional display control means 9 and provides the selected contents to the displaying means 11. As a result, it becomes possible to accurately determine positional location of the vehicle while driving, from the positional relationship of the marks indicative of the departure point, the destination point, the passing points and the current position of the vehicle displayed on the screen.

Figure 2:
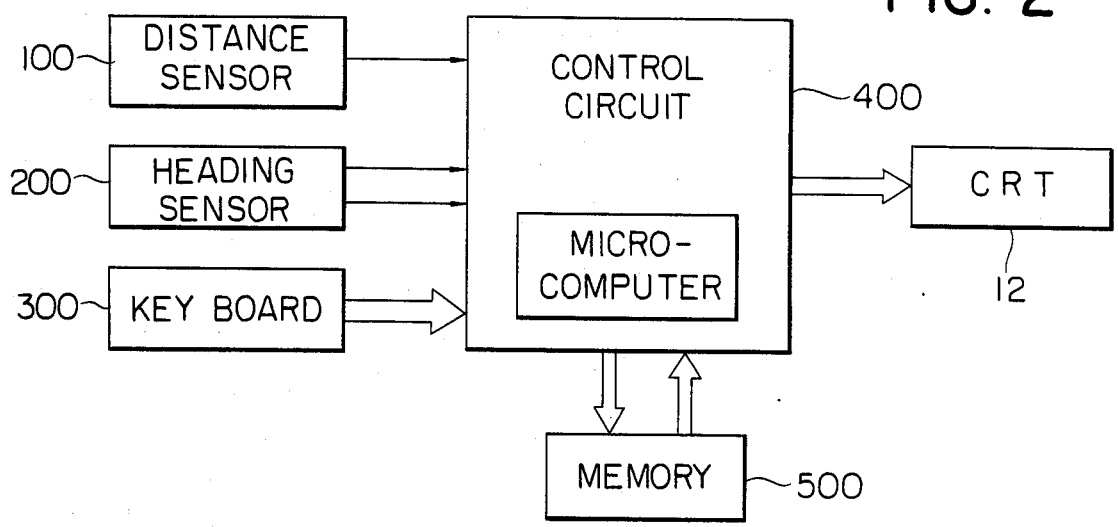
FIG. 2 shows a hardware block diagram corresponding to the arrangement of FIG. 1.

The functional arrangement of this invention shown in FIG. 1 is specifically shown in FIG. 2 in the form of hardware. It is seen from FIG. 2 that the hardware of this invention is formed of a running distance sensor 100, a vehicle heading sensor 200, a key board 300, a control circuit 400, a semiconductor memory 500 and a CRT 12. The distance sensor 100 detects the rotational speed of a vehicle's wheel by means such as an electromagnetic pickup or a reed switch, and provides, as a detection output therefrom, pulses the frequency of which is proportional to the rotational speed of the vehicle's wheel to the control circuit 400.

Figure 3:
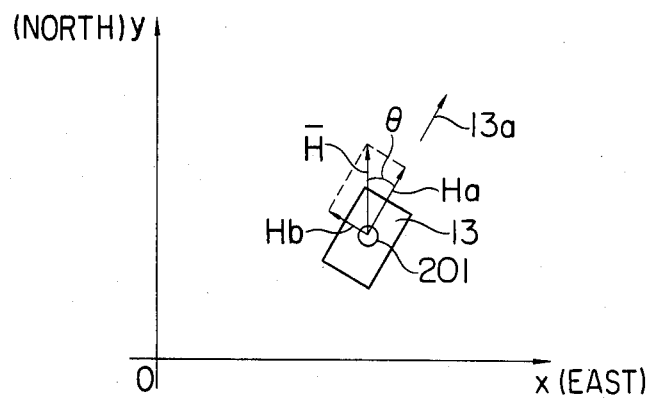
FIG. 3 shows a graph for explaining a vehicle's heading sensor used in FIG. 2.

The heading sensor 200 detects the earth magnetism [H] (vector) being decomposed into a heading component Ha and the normal component Hb, as shown in FIG. 3, which is perpendicular to Ha by an earth magnetism detector 201 of a flux-gate type which is fixed on the vehicle 13, and outputs a signal corresponding to the detected magnetism to the control circuit 400.

Figure 4:
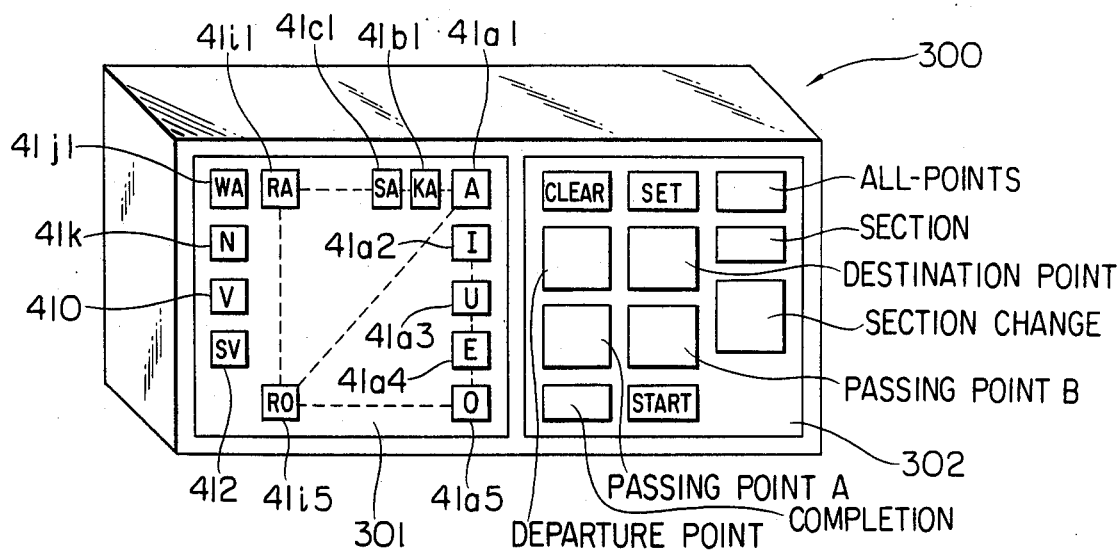
FIG. 4 shows a perspective view of a key board used in FIG. 2.

As illustrated in FIG. 4, the key board 300 includes a character key portion 301 and a control key portion 302. The character key portion 301 consists of character keys representative of the "A" to "N" Japanese alphabet called "Kana", which have been represented and will be hereinafter represented by capital letters for the convenience's sake, as well as a voiced sound key represented by "V" and a semi-voiced sound key represented by "SV" which are utilized in combination with the character keys to generate the remaining Kana characters as shown in table in FIG. 5. The control key group 302 consists of control keys indicative of "CLEAR", "SET", "DEPARTURE POINT", "DESTINATION POINT", "PASSING POINT A", "PASSING POINT B", "COMPLETION", "ALL-POINTS", "SECTION", "SECTION CHANGE" and "START" functions.

The character key board 301 is utilized to input all syllables known as "Kana" characters representative of all the syllables utilized in speaking Japanese.

A Japanese "Kana" Table (alphabet) is shown in FIG. 5 in which all the Kana characters are represented by Roman characters. Specifically, the table comprises 44 CLEAR SOUND Kana characters from A to WA enclosed with a thick line in which rows 41a–41j are respectively called "A" row, "KA" row, "SA" row, "TA" row, "NA" row, "HA" row, "MA" row, "YA" row, "RA" row and "WA" row, respectively, an "N" SOUND Kana character shown in row 41k enclosed with a thick line, VOICED SOUND Kana characters shown in rows 41m–41o, SEMI-VOICED SOUND Kana characters shown in row 41p, CONTRACTED SOUND characters shown in rows 41q–41w, VOICED CONTRACTED SOUND Kana characters shown in rows 41y–41z and SEMI-VOICED CONTRACTED SOUND characters shown in row 41zz.

Next, the manner of inputting these Kana characters into the system using the keys 41 will be described. Referring to FIG. 4, a first column of keys 41a1, 41a2, 41a3, 41a4, and 41a5 shown in FIG. 4 is utilized to enter the respective CLEAR SOUND Kana characters "A", "I", "U", "E" and "O" shown in row 41a in FIG. 5, a second column of keys represented by key 41b1 shown in FIG. 4 is utilized to enter the respective CLEAR SOUND Kana characters "KA", "KI", "KU", "KE" and "KO" shown in row 41b, and so on for the remaining CLEAR SOUND Kana characters as represented in the Kana table shown in FIG. 5 by the keys 41c1–41k. Key 41j1 represents the CLEAR SOUND Kana character "WA" while key 41k represents the Kana N. The key 410 is utilized in combination with the keys for generating the CLEAR SOUND characters to generate the VOICED SOUND characters. The key 412 is utilized in combination with the kys for generating the CLEAR SOUND Kana characters to generate the SEMI-VOICED SOUND Kana characters. For example, to generate the SEMI-VOICED SOUND PA, first the CLEAR SOUND key representative of the Kana SOUND "HA" is pressed after which the key 412 is pressed, thereby changing the inputted sound from "HA to "PA". Similarly, the SEMI-VOICED SOUND Kana characters "PI", "PU", "PE" and "PO" are inputted by first inputting the respective CLEAR SOUND Kana characters "HI", "FU", "HE" and "HO", and then pressing the key 412, respectively.

The VOICED SOUND Kana characters are inputted as follows. First a CLEAR SOUND KEY is pressed and then the key 410 is pressed. For example, to input the VOICED SOUND Kana character "GA", first the Kana character "KA" is inputted by pressing the corresponding CLEAR SOUND key, and then the key 410 is pressed to change the inputted Kana character from "KA" to "GA". Similarly, by pressing the key 410, inputted CLEAR SOUND Kana characters "KI", "KU", "KE" and "KO" can be changed to "GI", "GU", "GE", and "GO", the characters "SA", "SHI", "SU", "SE", and "SO" can be changed to "ZA", "JI", "ZU", "ZE" and "ZO", characters "TA", "CHI", "TSU", "TE" and "TO" can be changed to "DA", "JI", "ZU", "DE" and "DO", and characters "HA", "HI", "FU", "HE" and "HO" can be changed to "BA", "BI", "BU", "BE" and "BO", respectively.

The Kana "N" can be entered upon pressing the key 41k.

Next, the manner of entering tnhe CONTRACTED SOUND Kana characters will be described. For example, for entering the city name Kyoto, the CONTRACTED SOUND Kana "KYO" and the CLEAR SOUND "TO" must be inputted. To insert the Kana "KYO", first the key representative of the Kana "KI" is pressed after which the key representative of the Kana "YO" is pressed. Next, the key representative of the Kana "TO" is pressed, thereby inputting the word "KIYOTO". If no city "KIYOTO" exists in the memory, the system will automatically display the city KYOTO, whereby the CLEAR SOUNDS "KI" and "YO" are automatically changed to the CONTACTED SOUND Kana "KYO". Similarly, all the other CONTRACTED SOUND Kana can be generated by inputting the closest combination of CLEAR SOUND Kana.

The lines I-IV shown in FIG. 5 joining the the CLEAR SOUND Kana rows to the VOICED SOUND Kana rows are indicative of the respective transformations which occur to the respective Kana when the key 410 is pressed and the line IV' indicates the transformation which occurs when the key 412 is pressed after the respective CLEAR SOUND Kana have been entered.

The entry of Kana character by the activation of a key of the character key portion 41 is read in the control circuit 400.

The semiconductor memory 500 is composed of, for example, a ROM (Read Only Memory) which has stored therein point information consisting of geographical name information (i.e. city names, town names, etc.) and the geographical position information thereof. The stored information is read out by the control circuit 400.

Figure 6A:
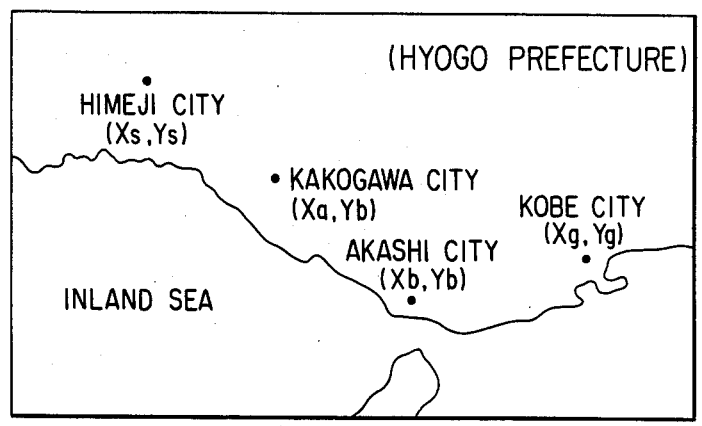
FIG. 6A shows a map of Hyogo Prefecture of Japan and FIG. 6B shows a relationship between the map of Japan and the coordinates thereof.
Figure 7:
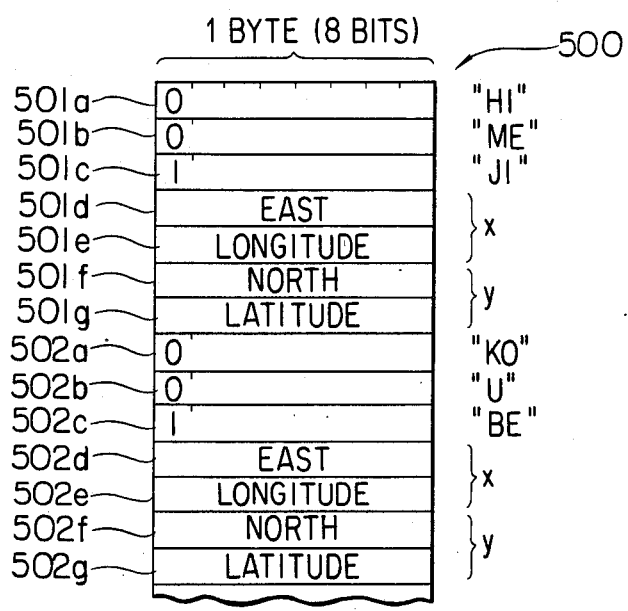
FIG. 7 shows a table of geographical point information stored in a semiconductor memory used in FIG. 2.

For example, the point information of the city hall of HIMEJI (i.e. Himeji) City in Japan shown in FIG. 6A is stored in memories 501a–501g in a memory table of the semiconductor memory 500 illustrated in FIG. 7. In the memories 501a–501c, "HIMEJI" as a geographical information is sequentially stored in the form of the codes respectively representative of the Japanese "Kana" characters —HI", "ME", and "JI". It is to be noted that each of the memories comprises 8 bits. The most significant bits of each of the memories 501a–501c serves to indicate the information of a geographical name in which the memory 501c having stored therein the last character of the geographical name information is assigned "1" while the other memories 501a and 501b are assigned "0", as shown in FIG. 7. Therefore, the remaining seven bits of each of the memories 501a–501c represent a "Kana" character. With seven bits, it is possible to express all of the "Kana" characters having a clear sound, a voiced sound, a semi-voiced sound, a double sound, and a contracted sound, as illustrated in FIG. 5. The memories 501d–501g have stored therein the positional information of Himeji City in which the memories 501d and 501e serve to store the longitude of Himeji City while the memories 501f and 501g serve to store the latitude of Himeji City. Similarly, memories 502a–502g have stored therein the point information of, for example, "Kobe" (FIG. 6A) which is entered as "Koube" to expdress "Kobe" in a more accurate manner in Japanese.

Figure 6B:
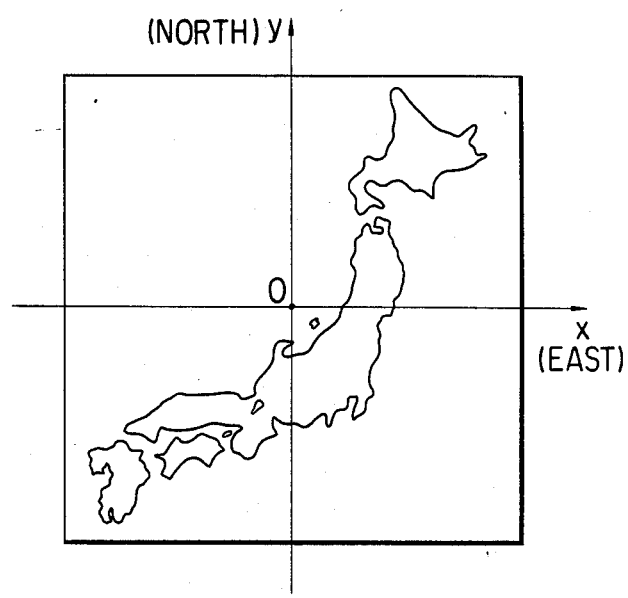

To obtain the positional information, coordinate axes X (East) and Y (North) may be set for the convenience's sake as shown by fthe map of Japan in FIG. 6B whereby geographical coordinates (x, y) represented by the relative distance on the basis of the coordinate axes may be stored in the memories. In this case, Japan is divided into 1700 Km squares in which this 1700 Km length is assigned 2 bytes (16 bits) of the memories 501d (or 502d) and 501e (or 502e) for the abscissa (X-distance) and 2 bytes of the memories 501f (or 502f) and 501g (or 502g) for the ordinate. Therefore, 1 bit is assigned about 26 m which results in a practical unit.

Meanwhile, there exist about 680 cities all over Japan while by preparing about 300 geographical names including the names of wards, towns, villages, interchanges, stations, castles, lakes, passes, mountains, and peaks per one prefecture, about 13800 geographical names should be prepared in total for 46 divisions of Japan (including one Metropolitan District and 45 prefectures but not including Okinawa Prefecture). Supposing that the number of characters of a geographical name is five on the average, one point information requires 9 bytes (i.e. 5 bytes for a geographical name; 2 bytes for x coordinate (abscissa); 2 bytes for y coordinates (ordinate)) so that 124200 bytes are required to store 13800 points of Japan.

In order to store the information of 13800 points, there are required four ROM's each of which has the maximum storage capacity of 256K bits as commercially available at present. However, with a ROM of 1M bit which is expected to be commercially available in the near future, only one ROM would be sufficient, in which a small-sized, light, and highly reliable semiconductor memory can be utilized.

Figure 8:
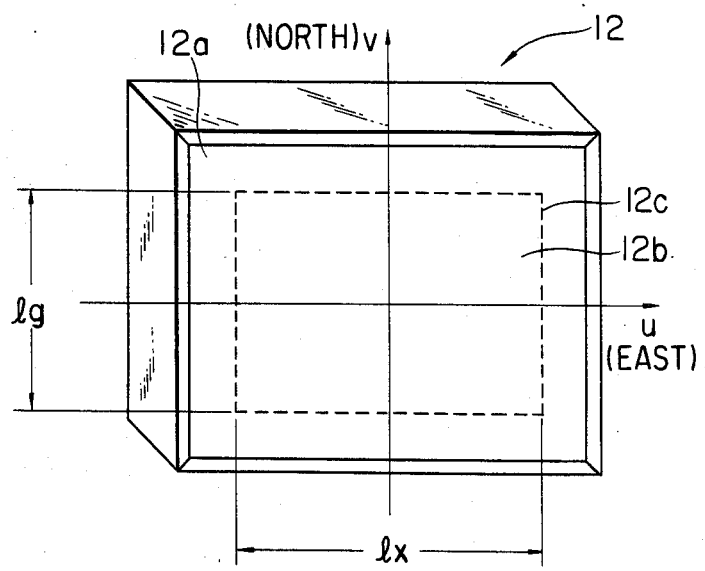
FIG. 8 shows a relationship between the screen of a cathode ray tube and the coordinates on the screen.

The CRT 12 may comprise a conventional one and is assumed to have a rectangular screen 12a as shown in FIG. 8. It should be noted that coordinate axes U and V are perpendicular to each other to indicate screen coordinates (u, v) in the screen 12a on which the marks of a departure point, a destination point, passing points and the current position of the vehicle are to be indicated, as will be described later.

The control circuit 400 comprises a well known micro-computer system, and includes various I/O interface circuits (not shown). The control circuit 400 reads out the positional information from the semiconductor memory 500 on the basis of the information of a geographical name which is entered by the activation of the key board 300, and causes the CRT 12 to display marks indicative of the points in an adequate reduced scale determined by the positional relationship between the departure point, the destination point and the passing points of the vehicle. Furthermore, the control circuit 400 inputs signals from the running distance sensor 100 and the heading sensor 200, computes the current position of the vehicle on the basis of said signals, and controls the CRT 12 to display a mark indicative of the current position of the vehicle in a predetermined reduced scale at the corresponding coordinates on the screen 12a.

The operation of the control circuit 400 will now be described in detail with reference to flow charts illustrated in FIGS. 9A-9N.

Figure 9A:
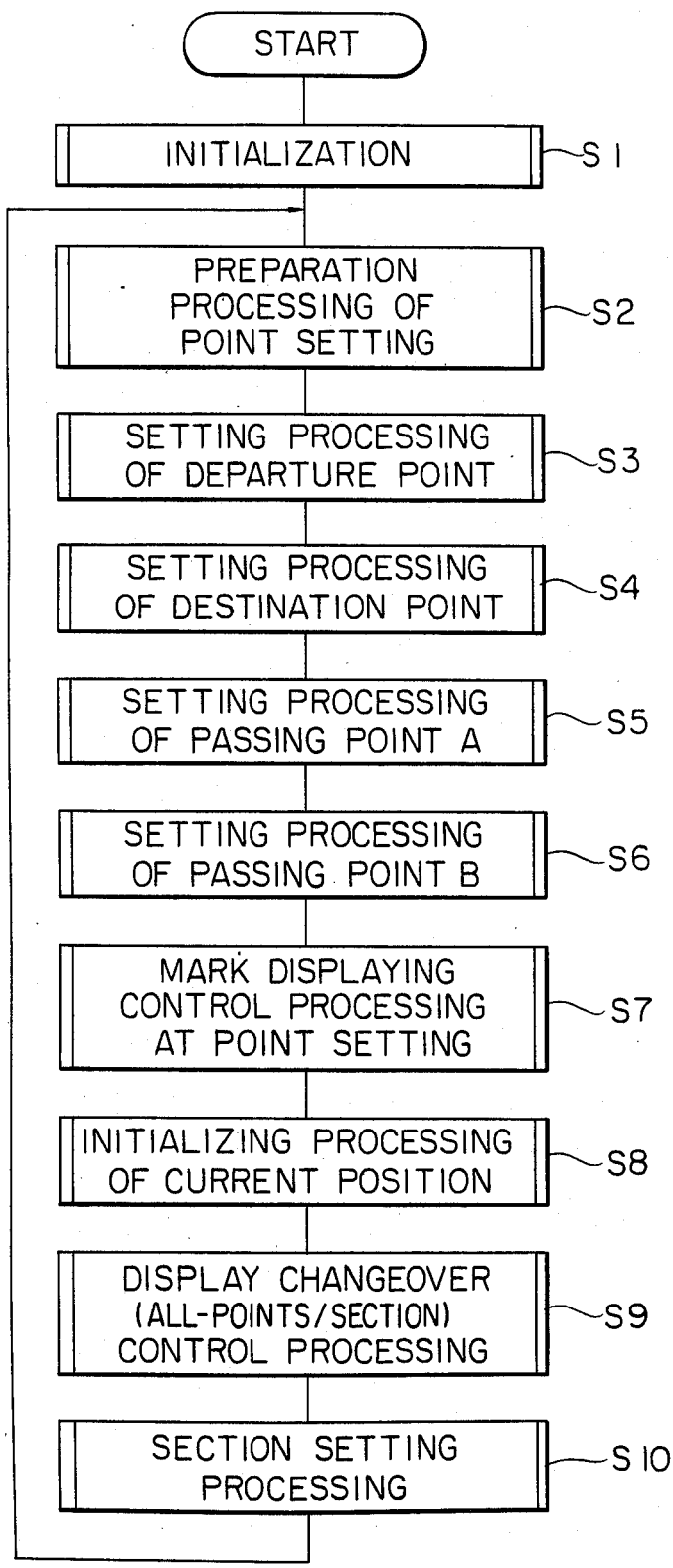
FIG. 9A shows a main flow chart of the program executed by a control circuit shown in FIG. 2, and FIGS. 9B–9N respectively show detailed flow charts of the subroutines of the main flow chart in FIG. 9A.

FIG. 9A illustrates the flow chart of a main routine of the program used for the control circuit 400. This general flow chart is started by an operation such as an electrical supply operation for the control circuit 400. At Step S1, variables are initialized, and then, a subroutine S2 for a preparation processing for setting points, a subroutine S3 for a setting processing of a departure point, a subroutine S4 for a setting processing of a destination point, a subroutine S5 for a setting processing of a passing point A, a subroutine S6 for a setting processing of a passing point B, a subroutine S7 for a mark display control processing at the time of setting the points, a subroutine S8 for an initializing processing of the current position, a subroutine S9 for a diasplay changeover (all-points display/sectional display) control processing and a subroutine S10 for a section setting processing are sequentially executed repeatedly.

Figure 9B:
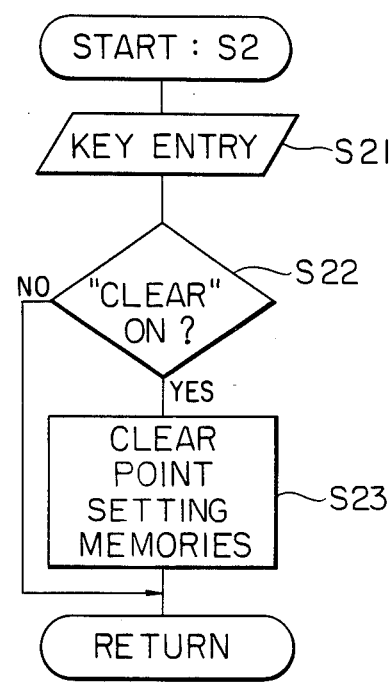

More specifically, an operator depresses the "CLEAR" key of the key board 300 before setting a departure point and a destination point. Consequently, in a flow chart of FIG. 9B illustrating the details of the subroutine S2 for the preparation processing of the point setting, the above depression of the key is detected at Steps S21 and S22, and then memories Pn, X, Y, Xn, Xs, Ys, Gn, Xg, and Yg (not shown), which will be described later, for setting respective points are all cleared and a memory K for storing section numbers, which will be also described later, is set to "1" at Step S23.

Figure 9E:
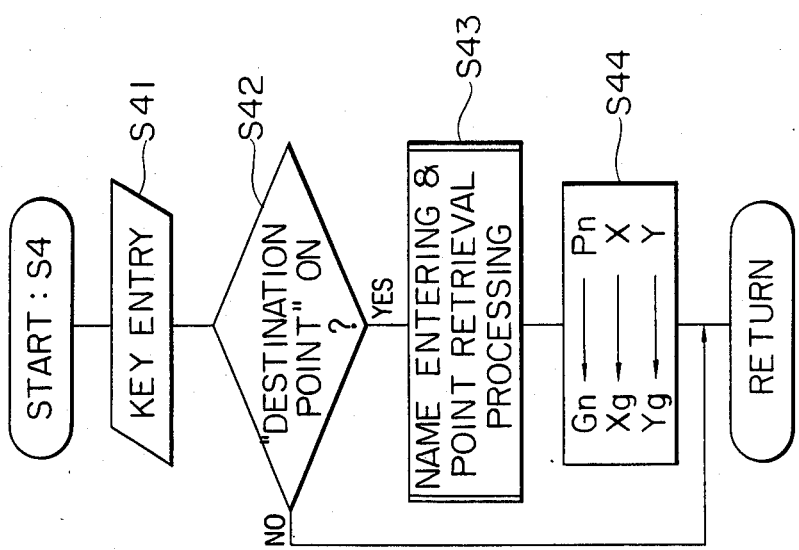
Figure 9D:
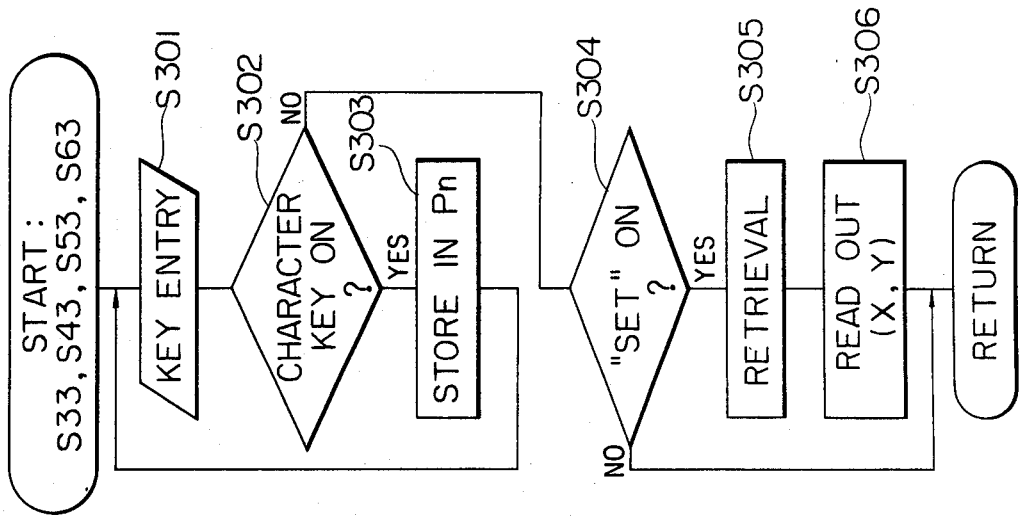
Figure 9C:
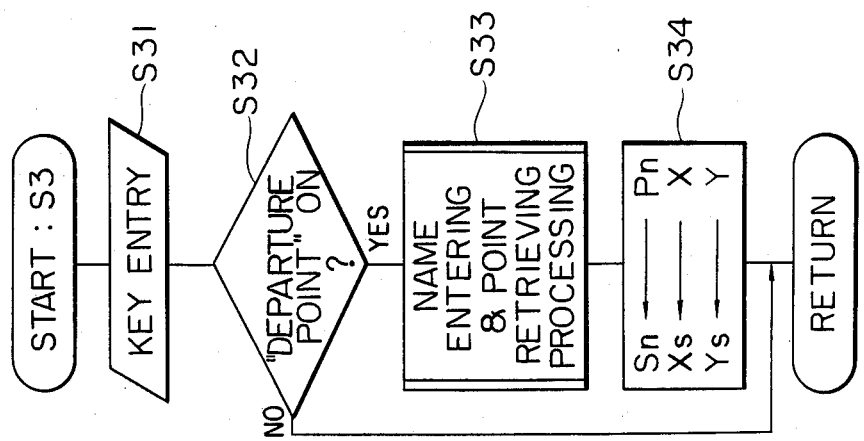

Then, a departure point is entered, that is, when for example, "Himeji City" is to be set, the "DEPARTURE POINT", "HI", "ME", "SHI", "V" (key 410) and "SET" keys on the key board 300 are sequentially depressed. Consequently, in a flow chart of FIG. 9C illustrating the details of the subroutine S3 for the setting processing of the departure point shown in FIG. 9A, the depression of the "DEPARTURE POINT" key is first detected at Steps S31 and S32 whereby a subroutine S33 for a geographical name entering processing and a point retrieving processing is executed. At Step S301 in a flow chart in FIG. 9D illustrating the details of the subroutine S33, the contents of the entered key are read in, and when the contents of the entered key are found to be characters at Step S302, they are stored in the memory Pn (n=1, 2, - - - ) for storing the characters of geographical names. Every time a character key is depressed once, Steps S301-S303 are executed so that "HI" is stored in a memory P1, "ME" in a memory P2, "SHI" in a memory P3, and "V" in a memory P4, respectively, the memories P1-P4 being not shown. Finally, the depression of the "SET" key is detected at Steps S302 and S304, and at Step S305 the combination of the entered characters "HI", "ME", "SHI", and "V" is retrieved from the semiconductor memory 500 whereby a point information having the combination of the characters "HI", "ME", "SHI" and "V" (the combination of "SHI" and "V" is regarded as "JI" on this retrieval) stored in the memories 501a-501g is retrieved and at S306 the positional information of the point information stored in the memories 501d-501g is read out. The contents of the memories 501d and 501e are stored in the memory X while the contents of the memories 501f and 501g are stored in the memory Y.

Then, the program returns to Step S34 in the flow chart of FIG. 9C where the entered information of the geographical name in the memory Pn and the retrieved positional information in the memories X and Y are respectively transferred to the memories Sn (n=1, 2, - - - ), Xs, and Ys and are representative of a departure point. Hereby, the setting processing of the subroutine S3 for the departure point has been completed.

It is to be noted that the contents of the memories Sn (n=1, 2 - - - ), Xs, and Ys respectively denote the geographical name of the departure point, the X coordinate value of the positional information of the departure point, and the Y coordinate value of the positional information of the departure point.

Next, a destination point is entered in the subroutine S4 shown in FIG. 9A. When for example, city Kobe which is identical to Koube in Japanese is selected, the "DESTINATION POINT", "KO", "U", "HE", "V" keys (key 410), and "SET" on the key board 300 shown in FIG. 4 are sequentially depressed. Consequently, in FIG. 9E illustrating the detailed flow chart of the subroutine S4, the activation of the "DESTINATION POINT" key is detected at Steps S41 and S42, and then the proram proceeds to Step S43 which corresponds to Step S33 in FIG. 9C so that the description thereof will not be repeated. After the execution of Step S43, at Step S44 the information of the geographical name in the memory Pn, and the retrieved positional information in the memories X and Y are respectively transferred to the memories Gn, Xg, and Yg for the destination point. It is to be noted that the contents of the memories Gn (n=1, 2 - - - ), Xg, and Yg respectively denote the geographical name of the departure point, the X coordinate value of the positional information of the destination point, and the Y coordinate value of the positional information of the destination point.

Thus, after the execution of the setting processing of the destination point (subroutine S4) has been completed, passing points, e.g. Kakogawa City and Akashi City (shown in FIG. 6A) which the vehicle 13 transmits while running from the departure point to the destination point are set in the same process as the subroutine S3 for the departure point setting processing. Namely, as illustrated in the flow chart of FIG. 9F corresponding to the subroutine S5 for the passing point A setting processing, the activation of "PASSING POINT A" key is detected at Steps S51 and S52, and then at Step S53 which corresponds to Step S33 illustrated in FIG. 9C or Step S43 illustrated in FIG. 9E, the geographical name of "Kakogawa" is entered and the point information thereof is retrieved, whereby the passing point A is set at Step S54. It is to be noted that the contents stored in the memories An (n=1, 2 - - - ), Xa, and Ya respectively denote the geographical name of the passing point A, the X coordinate (abscissa) value of the positional information of the passing point A, and the Y coordinate (ordinate) value of the positional information of the passing point A.

Next, as illustrated in the flow chart of FIG. 9G corresponding to the subroutine S6 for the passing point B setting processing, the activation of "PASSING POINT B" key is detected at Steps S61 and S62, and then at Step S63 which corresponds to Step S33 illustrated in FIG. 9C or Step S43 illustrated in FIG. 9E, the geographical name of "Akashi" is entered and the point information thereof is retrieved, whereby the passing point B is set at Step S64. It is to be noted that the contents stored in the memories Bn (n=1, 2 - - - ), Xb, and Yb respectively denote the geographical name of the passing point B, the X coordinate (abscissa) value of the positional information of the passing point B, and the Y coordinate (ordinate) value of the positional information of the passing point B.

It is also to be noted that while the above embodiment limits the number of passing points to two, one or three or more passing points may be readily set by the addition of subroutines such as the subroutine S5 or S6.

After the settings of the departure point, the destination point and the passing points A and B have been thus processed, the operator depresses the "COMPLETION" key. Consequently, the subroutine S7 for the mark display control processing at the time of settng the points illustrated in FIG. 9A will be executed along a flow chart illustrated in FIG. 9H. In this flow chart, at Steps S71 and S72, the depression of the "COMPLETION" key is detected. Then, as will be described hereinafter, a reduced scale is determined such that marks respectively indicative of the departure point, the passing points A and B, and/or the destination point may be displayed on the periphery 12c of a rectangular zone 12b, having a lateral length of lx and longitudinal length of ly, preliminarily imaginarily set on the screen 12a of the CRT 12 shown in FIG. 8.

Namely, first of all, at Step S73, maximum values Xmax, Ymax and minimum values Xmin, Ymin are determined from every component (abscissa, ordinate) of the coordinates respectively of the departure point, the destination point and the passing points. In this embodiment as shown in FIG. 6A where the departure point is Himeji City, the destination point is Kobe City, and the passing points A and B are Kakogawa City and Akashi City respectively, the following values are given:

Xmax=Xg
Xmin=Xs
Ymax=Ys
Ymin=Yb

Figure 9K:
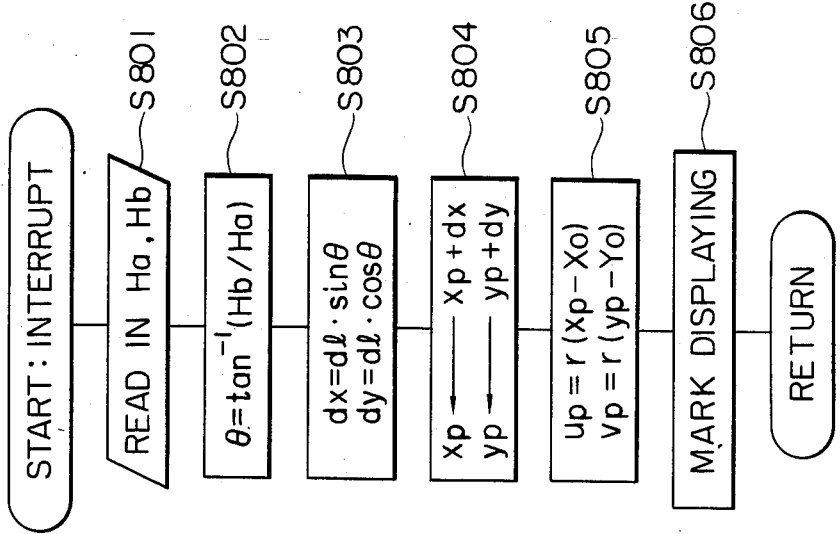
Figure 9J:
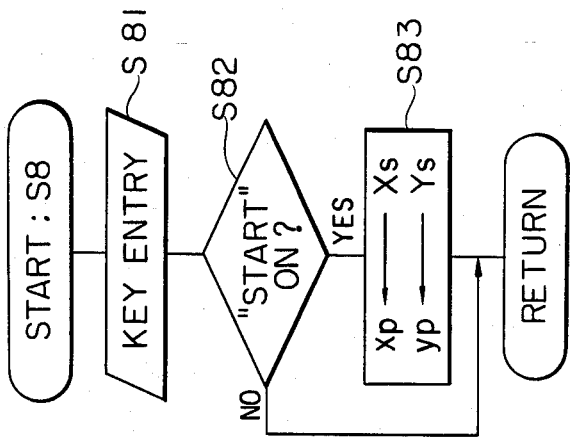
Figure 9I:
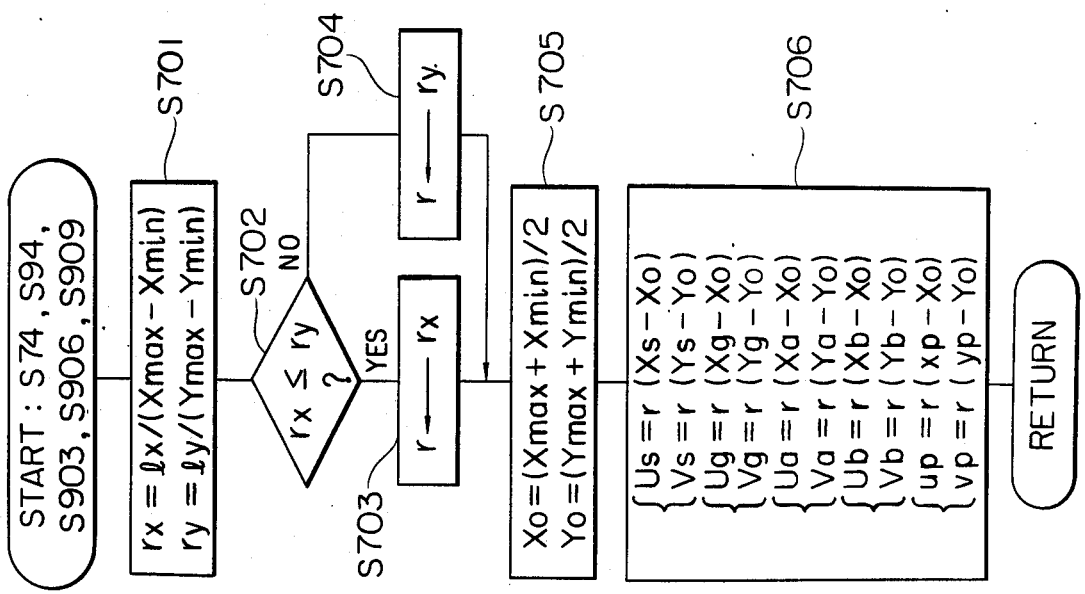

Then, a subroutine S74 for the processing of the computation of the coordinates is executed along a flow chart illustrated in FIG. 9I. In this flow chart, at Step S701, the ratio of the lateral length lx of the rectangular zone 12b of the screen 12 to a distance (Xmax−Xmin) in the lateral direction (from East to West) between the maximum value Xmax and the minimum value Xmin on the abscissa X is determined as rx=lx/(Xmax−Xmin)=lx/(Xg−Xs), and the ratio of the longitudinal length lx of the rectangular zone 12b of the screen 12 to a distance (Ymax−Ymin) in the longitudinal direction (from North to South) between the maximum value Ymax and the minimum value Ymin of the ordinate Y is determined as ry=ly/(Ymax−Ymin)=ly/(Ys−Yb). Then, at Step S702, the magnitudes of the above ratios rx and ry are compared. If rx≦ry, rx is determined to be a reduced scale r while if rx>ry, ry is determined to be the reduced scale r (Steps S703, S704). It is to be noted that this embodiment gives rx<ry as seen from FIG. 6A so that rx is selected as the reduced scale r.

Then, at Step S705, the coordinates (Xo, Yo) of the middle point of the coordinate values Xmax, Ymax and Xmin, Ymin are calculated on the basis of the following equations:

Xo=(Xmax+Xmin)/2

Yo=(Ymax+Ymin)/2 and in order that the middle point may correspond to the central point, i.e. the origin (u=0, v=0), of the rectangular zone 12b, the conversion of the coordinates and the reduction of the reduced scale are calculated at Step S706 on the basis of the following equations:

Us=r(Xs−Xo)

Vs=r(Ys−Yo)

Ug=r(Xg−Xo)

Vg=r(Yg−Yo)

Ua=r(Xa−Xo)

Va=r(Ya−Yo)

Ub=r(Xb−Xo)

Vb=r(Yb−Yo)

up=r(xp−Xo)

vp=r(yp−Yo)

where the coordinate values Xs, Ys, Xg and Yg respectively indicate the contents of the memories Xs, Ys, Xg and Yg, (Us, Vs) represents the coordinates of the departure point on the screen 12a, (Ug, Vg) represents the coordinates of the destination point on the screen 12a, (Ua, Va) and (Ub, Vb) represent the coordinates of the passing points A and B, respectively, and (up, vp) represents the coordinates of the current position of the vehicle. In this way, the coordinates of the departure point and the destination point are respectivey positioned on the outer periphery 12c of the rectangular zone 12b. It should be noted that, as can be seen from step S73, if one of the points Xmax, Xmin, Ymax, Ymin corresponds to one or both of the passing points A and/or B, the calculation of the middle point Xo, Yo will be based thereon, and, accordingly the two points appearing on the outer periphery 12C will not be the departure point and destination point, but one of the passing points and either the other passing point, the departure point or the destination point. The calculation of the coordinates (up, vp) of the current position of the vehicle on the screen 12a after the vehicle has started will be described later.

Figure 10A:
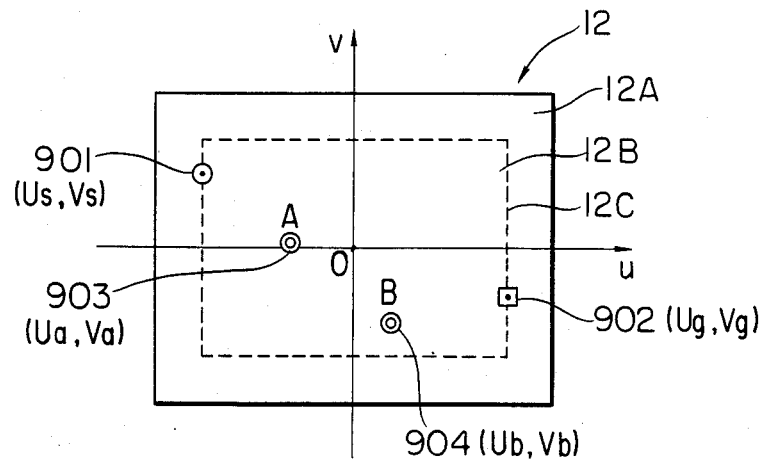
FIGS. 10A–10E respectively show displayed examples indicating marks of departure, destination, and/or passing points as well as a vehicle's current position with a message of the kind of the display being displayed on the screen of a CRT; and, FIGS. 11A and 11B as well as 12A and 12B respectively show other displayed examples indicating marks of departure, destination, and/or passing points as well as a the vehicle's current position as well as a message indicative of where the vehicle is being driven on the screen of the CRT.

Thus, the execution of the subroutine S74 for the processing of the coordinate calculation has been completed, and then the program returns to Step S75 in FIG. 9H in which a display signal is outputed to the CRT 12 from the control circuit 400 so that a mark 901 of the departure point, a mark 902 of the destination point, and marks 903 and 904 respectively indicative of the passing points A and B may be displayed on the screen 12a, shown in FIG. 10A, at the calculated coordinates (Us, Vs), (Ug, Vg), (Ua, Va), and (Ub, Vb) respectively of the departure point, the destination point, the passing points A and B. Thus, the execution of the subroutine S7 of FIG. 9A hs been completed.

When the vehicle is positioned at the departure point set, the operator may immediately depress the "START" key on the key board 300. If the vehicle is positioned a little far from the coordinates of the departure point, the operator may depress the "START" key when the vehicle has reached the geographical coordinates (Xs, Ys) which corresponds to the coordinates (Us, Vs) on the screen 12a of the departure point. According to this, the subroutine S8 for the initializing processing of the current position of the vehicle illustrated in FIG. 9A will be executed along a flow chart illustrated in FIG. 9J. In this flow chart, at Steps S81 and S82, the depression of the "START" key is detected, and then at Step S83 the geographical coordinates (Xs, Ys) of the departure point are set in memories "xp" and "yp" (not shown), for the coordinates of the current position of the vehicle, used for an integral computation of the current position of the vehicle.

Thus, with the settings of the departure point, the destination point, and the current position of the vehicle having been completed and with the vehicle being continuously driven, an interrupt command is inputted to the micro-computer of the control circuit 300 each time the running distance sensor 100 generates a pulse at an interval of a unit running distance dl (for example, 1 m), thereby executing an interrupt processing shown in FIG. 9K.

In the flow chart of FIG. 9K, heading signals Ha and Hb are read in by the micro-computer of the control circuit 300 at Step S801, and an angle θ derived from the earth magnetism [H] (vector) shown in FIG. 3 and the vehicle's heading 13a is calculated at Step S802 from the following equation:

θ=tan$^{-1}$(Hb/Ha)

Then, heading components dx and dy of the unit running distance d1 with respect to the coordinate axes X and Y shown in FIG. 6B are calculated at Step S803 according to the following equations:

$$dx = dl \sin \theta$$

$$dy = dl \cos \theta$$

and are added to the values integrated so far in the memories xp and yp of the coordinate components of the current position of the vehicle at Step S804.

Figure 10B:
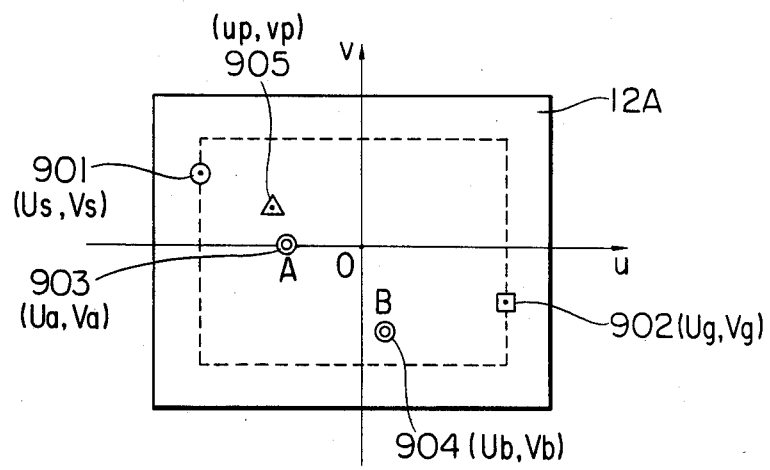

Then, at Step S805, the coordinates (up, vp) of the current position of the vehicle on the screen 12a are calculated according to the following equations:

$$up = r(xp - Xo)$$

$$vp = r(yp - Yo)$$

on the basis of the reduced scale r, and then at Step S806, a display signal is outputted from the control circuit 300 to the CRT 12 so that a mark 905 indicative of the current position of the vehicle may be displayed as shown in FIG. 10B at the coordinates (up, vp) on the screen 12a.

While the displaying operation shown in FIG. 10B is being done, when a driver further desires to known the positional relationship between the departure point, the passing point A, and the current position of the vehicle, he may operate the system as follows:

Namely, when the "SECTION" key of the control key portion 302 of the key board 300 is depressed, the processing for magnifying the display of a section between the departure point and the passing point A is executed in accordance with the subroutine S9 for the display changeover control (all-points displaying control/sectional displaying control) processing in FIG. 9A. It is to be noted that in this embodiment, a geometrical section between the departure point and the passing point A is defined as a first section, a geometrical section between the passing points A and B is defined as a second section, and a geometrical section between the passing point B and the destination point is defined as a third section.

Figure 9N:
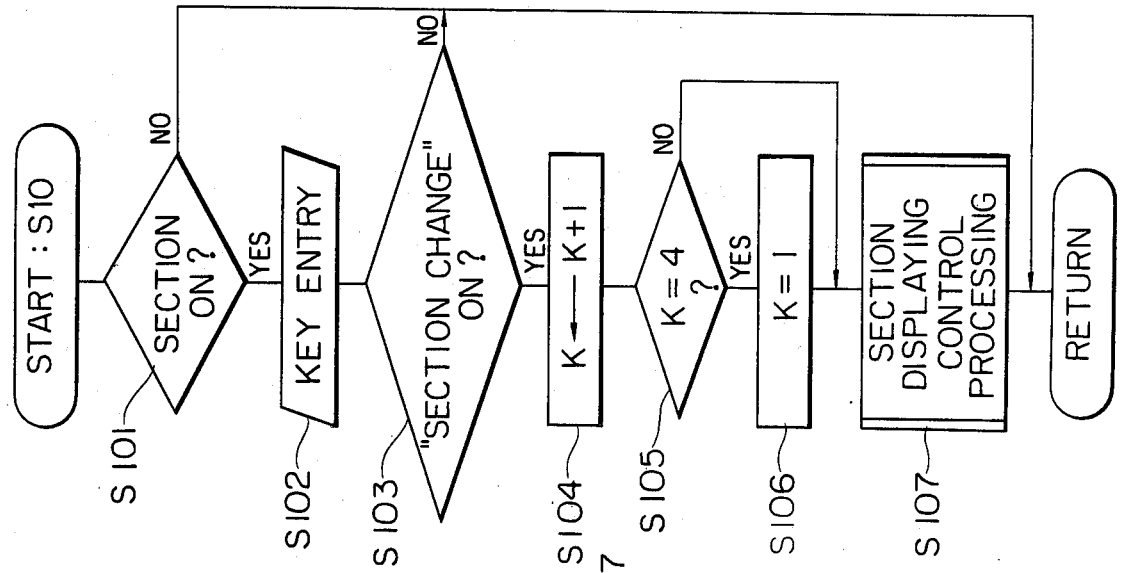
Figure 9L:
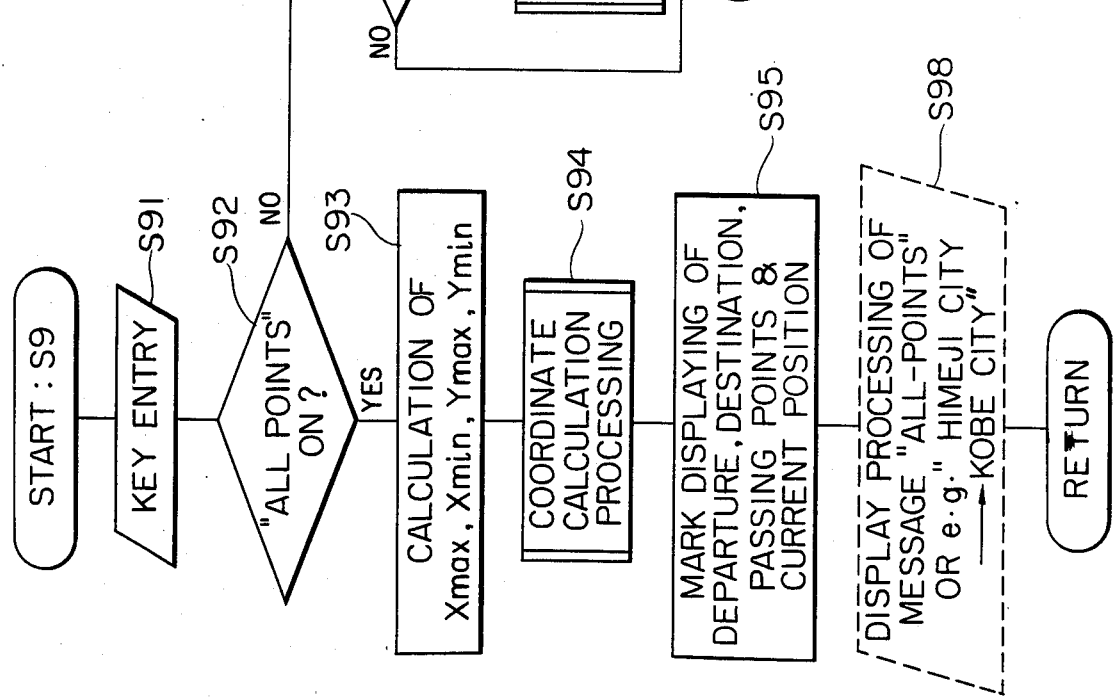

The subroutine S9 is illustrated in detail in the flow chart of FIG. 9L in which at Steps S91, S92, S96 the activation of the "SECTION" key is detected to execute the subroutine S97 for the sectional displaying control processing.

FIG. 9M illustrates the flow chart of the subroutine S97 in FIG. 9L in which at Step S901 the value of a section number K indicating whether or not a section where the vehicle is positioned is K is checked. If K=1, then the program proceeds to Step S902, if K=2, then the program proceeds to Step S905, and if K=3, then the program proceeds to Step S908. It is to be noted that at first the value of the section number K is set to "1" as its initial value at Step S23 in FIG. 9B, as previously set forth. Therefore, Step S902 is executed, in which the maximum values Xmax, Ymax, and the minimum values Xmin, Ymin among the coordinates values respectively of both end points in the first section, i.e. the departure point and the passing point A are determined. In this embodiment shown in FIG. 6A, $$Xmax = Xa$$

$$Xmin = Xs$$

$$Ymax = Ys$$

$$Ymin = Ya$$

After these values have been determined, the subroutine S903 for the coordinate calculation processing is executed. Since the subroutine S903 (and S906, S909) is identical with the subroutine S74 in FIG. 9H, the description thereof will not be repeated.

Then, at Step S904, marks indicating the points of the departure point, the passing point A, and the current position of the vehicle are respectively displayed at the coordinates of (Us, Vs), (Ua, Ub), (up, vp), on the screen 12a of the CRT 12, which are computed by the subroutine S903. As shown in a display example in FIG. 10C, such a simple operation as indicated above can readily achieve a magnified display (also called a sectional display) of a required portion.

Figure 10C:
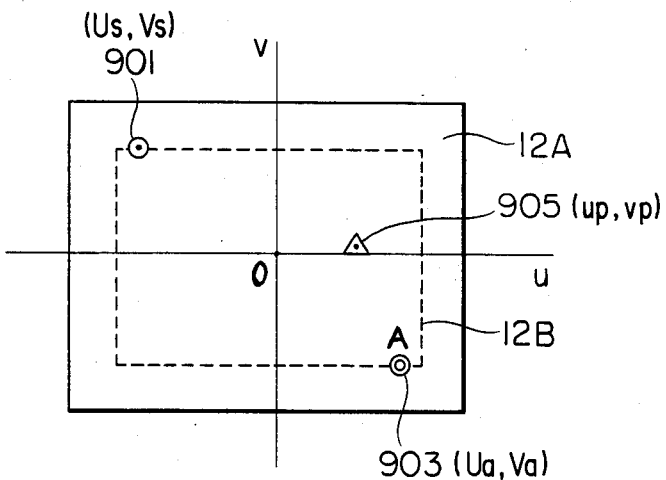
Figure 10:
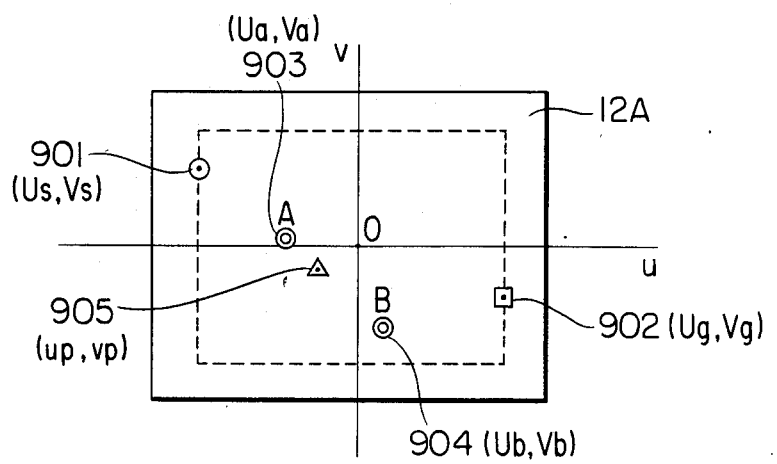
Figure 10:
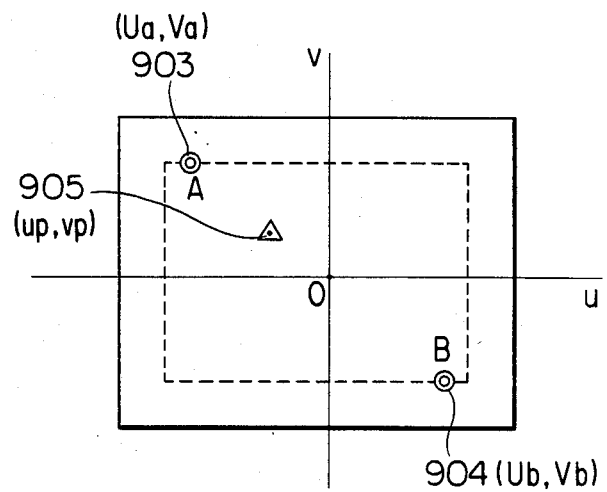

While the display shown in FIG. 10C is appearing, when the driver desires to restore the display state of FIG. 10B, the operation should be as follows:

When the "ALL-POINTS" key of the key board 300 is depressed, the depression of this key is detected at Steps S91 and S92 in the flow chart of FIG. 9L executing the subroutine S9, and then at Steps S93 and S94 which are respectively identical with Steps S73 and S74 in FIG. 9H, the coordinates on the screen 12a of the departure point, the destination point, the passing points A and B, and the current position of the vehicle are computed, and then at Step S95 the marks of all the points as well as the current position are displayed at the computed coordinates. Consequently, the displaying state returns to the state of FIG. 10B. It is to be noted that in FIG. 9L, Step S91, S92, or S96 coordinates to the display changeover means 10 in FIG. 1, Step S93, S94, or S95 corresponds to the all-points display control means 7 in FIG. 1, Step S97 corresponds to the sectional displaying control means 9, and the flow chart of FIG. 9N illustrating the subroutine S10 corresponds to the section setting means 8.

When the vehicle 13 continues to run and the displaying state of the screen 12a of the CRT 12 assumes the state of FIG. 10D, the "SECTION" key on the key board 300 is depressed in order to display in detail the positional relationship between the passing point A, the passing point B, and the current position of the vehicle, whereby the processing S97 of the sectional displaying control as set forth above is to be executed. However, in the flow chart illustrated in FIG. 9M which shows the details of the subroutine S97, the section number K remains unchanged as 1 at Step S901 so that Steps S902–S904 for a sectional display in the first section are again executed unfavourably. Therefore, in order to make a sectional display in the second section as desired, the following operations should be carried out:

If it is assumed that the "SECTION" key has been already depressed and the sectional display in the first section is being made, when the "SECTION CHANGE" key is depressed, the subroutine S10 for the section setting processing in FIG. 9A is executed as follows: In the flow chart in FIG. 9N illustrating the subroutine S10, it is firstly determined at Step S101 whether or not the section is being displayed on the screen 12a. If the section is displayed, then at Steps S102 and S103 the depression of the "SECTION CHANGE" key is detected and then at Step S104 the value of the section number K is increased by 1. It is to be noted that the section number K is set at Steps S105 and S106 such that if it reaches 4, it is reset to 1 again. Finally, at subroutine S107 which is identical with the subroutine S97 in FIG. 9L, the processing of the section display control is carried out.

As above described, the section number K has been changed to 2 by the execution of Step S104 and therefore, in the flow chart of FIG. 9M illustrating the subroutine S107 in FIG. 9N the program proceeds to Step S905 through Step S901. In this Step S905, the maximum values Xmax, Ymax, and the minimum values Xmin, Ymin along the coordinates respectively of both end points, i.e. the passing points A and B are determined, and then the subroutine S906, which is identical with the subroutine S903, for the coordinate computation processing is executed, and then at Step S907 the marks respectively indicating the passing points A, B and the current position of the vehicle are displayed on the screen 12a of the CRT 12, as shown in FIG. 10E.

Thus, by activating the "SECTION CHANGE" key while a section is being displayed, a magnified display can be made by selecting a desired section from among the first to third sections. It is to be noted that Steps S908-S910 in FIG. 9M perform the processing of the sectional display of the third section in which Step S908 corresponds to Step S902 or S905, Step S909 is identical with Step S903 or S906, and Step S910 corresponds to Step S904 or S907, whereby the passing point B, the destination point and the current position are displayed as the respective marks.

While in this embodiment a section between two adjacent points has been used, a section bridging, for example, three points may be used with the same sectional display processings as follows:

Departure point-passing point A-passing point B: a first section.

Passing point A-passing point B-destination point: a second section.

In accordance with the arrangement of the system of this invention, when a departure point, a destination point, and passing points of a vehicle are designated by their geographical names, the control circuit 400 reads out the positional information of a desired point from the point information as previously stored. The positional information is set as the coordinates of the points which are displayed with respective marks on an adequate reduced scale on the CRT and the current position of the vehicle which is computed every second is displayed by a respective mark. Furthermore, a selection (changeover) may be made between all-points display and a sectional display as desired. Consequently, a system having preferable navigation functions suitable for boarding on an automobile is provided as follows:

(1) The picture information of an actual map is not stored in the semiconductor memory but instead point information consisting of the information of given points is stored as a basic unit whereby the information of points over a wide range of areas can be stored.

(2) Since a departure point and a destination point are designated by their geographical names and the positional information previously stored is read out and set as the coordinates of the points, the positions of the points can be accurately set with easy operations.

(3) Since the marks 901-904 indicative of the points are displayed on adequate positions of the screen 12a on the basis of the distance between the departure point and the destination point and of the positional relationship therebetween and the mark 905 indicative of the current position of the vehicle is displayed on a reduced scale determined by the marks 901-904, the operator can devote his entire energy to driving the vehicle without having to perform cumbersome operations such as the settings of the positions of the marks and the reduced scale.

(4) Since a display on the screen 12a of the CRT is divided into an all-point display for displaying all of the departure point, the destination point, and the passing points as set and a sectional display for displaying two adjacent points of all of the points in which both of the displays may be changed over, it is possible to grasp the positional relationship between the points and the current position of the vehicle in a displaying manner as desired.

It is to be noted that while the above embodiment of this invention has dealth with a semiconductor memory such as a ROM as a point information storage means, if a storage of a large capacity such as a floppy disc is used, then more positional information can be stored. Also, a voice input device may be substituted for a key board. Furthermore, a liquid crystal display device of a dot-matrix type may be substituted for a CRT.

Figure 11A:
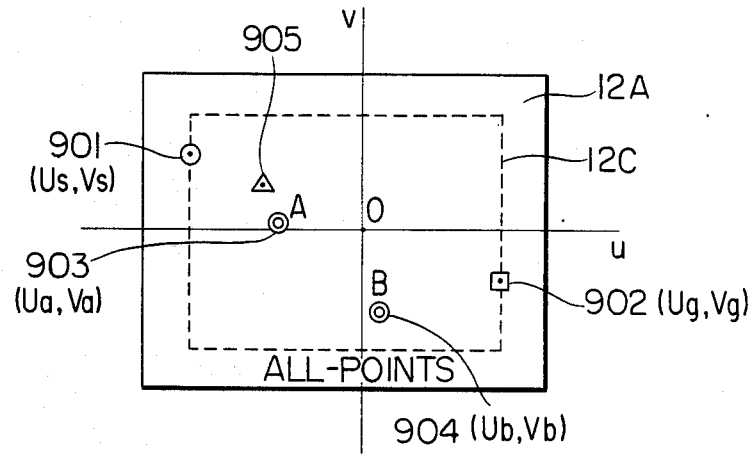
Figure 11B:
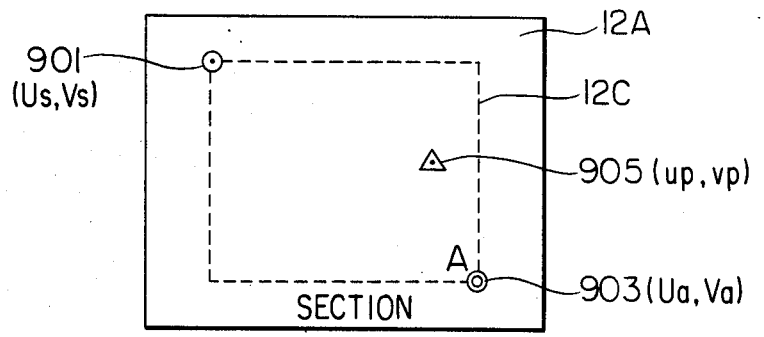

Next, there will be described another display example on the CRT 12 in accordance with this invention. In FIG. 11A, a message "ALL-POINTS" is displayed below the rectangular zone 12c of the screen 12a which shows all of the points entered as in FIG. 10B so that an operator may identify the display as showing all of the points entered. This display processing can be readily carried out by the addition of a displaying Step S76 or S98 enclosed by a dotted line, which is quite common to those skilled in the art, immediately after Step S75 in FIG. 9H or Step S95 in FIG. 9L, respectively. Also, in FIG. 11B, a message "SECTION" is displayed below the rectangular zone 12c of the screen 12a which only shows two of all of the points entered as in FIG. 10C so that an operator may identify the display as showing a sectional one. This display processing may be also carried out by the addition of a displaying Step S912 enclosed by a dotted line immediately after Step S904, S907, or S910 in FIG. 9M.

Thus, with the addition of a message of "ALL-POINTS" or "SECTION" to a display on the screen 12a, the operator will not erroneously recognize the status of the display upon selecting "ALL-POINTS" and "SECTION" keys of the control key portion 302 of the key board 300.

Figure 12A:
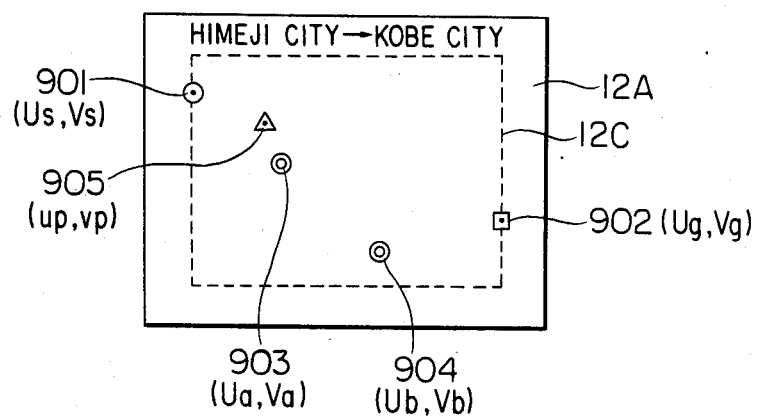
Figure 12B:
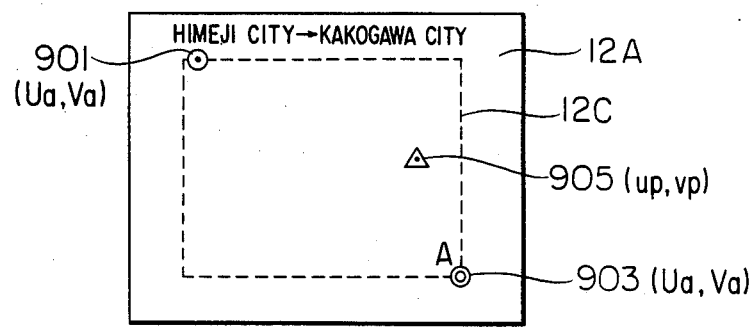

In FIGS. 12A and 12B, there are shown further different display examples according to the present invention in which, in FIG. 12A, above the rectangular zone 12c of the screen 12a for all of the points entered such as shown in FIG. 10B, the geographical names "Himeji City" and "Kobe City" respectively representing the departure point and the destination point are displayed on either side of an arrow displayed in the direction as shown in FIG. 12A. This display processing may be carried out by Step S76 or S98 immediately after Step S75 in FIG. 9H or Step S95 in FIG. 9L, respectively. Also, in FIG. 12B, the sectional display screen 12a shown in FIG. 10C is added with the geographical names "Himeji City" and "Kakogawa City" respectively representing the departure point and the passing point A. This display processing may be carried out by Step S912 immediately after Step S904, S907, or S910 in FIG. 9M.

Thus, with the geographical names of the departure point and the destination point being displayed during the displaying of all-points, or with the geographical names of the end points of a section set for a sectional display being displayed, the operator can easily recognize the geographical names of the points being displayed by the marks at any given time.

As described above, in accordance with this invention, a storage means has stored therein point information consisting of the information of the geographical name of the point as well as the geographical position of the point and a departure point, a destination point, the current position and passing points of a vehicle are displayed as respective marks at coordinates determined by those points according to the point information. Therefore, even a storage of a small capacity can be used as a data storage means capable of fully displaying the current position of the vehicle. Moreover, since the all-points display and the sectional display can be changed over therebetween as desired by simple operations, the current position of the vehicle can be accurately displayed. As a result, an on-board automotive navigation system, which is compact and cheap, having a fully practical navigation function is realized.

It is to be noted that while the present invention has been described with reference to the above embodiments illustrated in the accompanying drawings, it should not be limited to them and may be applied with various modifications thereof without departing from the spirit of the invention.

What we claim is:

1. An automotive navigation system comprising: a running distance detecting means for detecting the running distance of a vehicle; a vehicle heading detecting means for detecting the heading of the vehicle; a display means for enabling a planar display based on the two dimensional Cartesian coordinates system; a storage means for storing information comprising a geographical name and the positional information thereof for each of a plurality of points; and a control means for designating the geographical names of a departure point, a destination point, and at least one passing point along the path of the vehicle, reading out the positional information from said storage means of the designated geographical names, and receiving signals from said running distance detecting means and said heading detecting means, said control means further including means for alternatively computing coordinates on said display of marks indicative of two or more of said departure, destination, and passing points and a mark corresponding to the current position of the vehicle on the basis of their mutual positional relationship and in a reduced scale determined by said two or more points, respectively, and controlling said display means to display said marks at said computed coordinates.

2. An automotive navigation system according to claim 1 wherein said control means comprises:
   a current position computing means for computing the current position of the vehicle from the running distance detected by said running distance detecting means and the vehicle heading detected by said vehicle heading detecting means;
   a current position initializing means for initializing the current position of the vehicle for said current position computing means;
   a point setting means for entering the geographical names of said departure point, said destination point, and said passing point of the vehicle, for retrieving said geographical names from said storage means, for reading out the positional information corresponding to said geographical names, and for setting said positional information as the positions of said points;
   an all-points display control means for controlling said display means to display marks indicative of the respective positions of all of said points set by said point setting means and to display a mark indicative of the current position of the vehicle in a reduced scale determined by all of said points;
   a section setting means for selecting a section defined by less than all of said points;
   a sectional display control means for controlling said display means to display marks indicative of the respective positions of selected points defining said selected section and to display a mark indicative of the current position of the vehicle in a reduced scale determined by said selected points; and
   a display changeover means for selectively connecting one of said all-points display control means and said section display control means to said display means.

3. An automotive navigation system according to claim 2 wherein said all-points display control means includes means for controlling said display means to display the marks indicative of two of all of said points set on the outer periphery of a rectangular zone as imaginarily provided on the screen of said display means.

4. An automotive navigation system according to claim 2 wherein said sectional display control means includes means for controlling said display means to display the marks indicative of two of said selected points on the outer periphery of a rectangular zone as imaginarily provided on the screen of said display means.

5. An automotive navigation system according to claim 3 wherein said all-points display control means comprises means for computing coordinates on said display means of the depature, destination, and passing points and the current position of the vehicle on the basis of the mutual positional relationship therebetween, means for determining the maximum and minimum values of the positional information of all of said points entered, means for determining the middle point between said maximum and minimum values, and means for converting the positional information to the coordinate system by rendering said middle point coincident with the central point of the screen.

6. An automotive navigation system according to claim 4 wherein said sectional display control means comprises means for computing coordinates on said display means of the selected points and the current position of the vehicle on the basis of the mutual positional relationship means for determining the maximum and minimum values of the positional information of the selected points, means for determining the middle point between said maximum and minimum values, and means for converting the positional information to the coordinate system by rendering said middle point coincident with the central point of the screen.

7. An automotive navigation system according to claim 4 wherein said section setting means comprises means for setting a desired section by sequentially retrieving the existing sections between said departure point and said destination point.

8. An automotive navigation system according to claim 2 wherein said display changeover means comprises means for entering an all-points selection and a section selection.

9. An automotive navigation system according to claim 5 wherein said all-points display control means further comprises means for additionally displaying a message representative of all-points.

10. An automotive navigation system according to claim 6 wherein said sectional display control means further comprises means for additionally displaying a message representative of section.

11. An automotive navigation system according to claim 5 wherein said all-points display control means further comprises means for additionally displaying a message representative of the geographical names of said departure point and said destination point.

12. An automotive navigation system according to claim 6 wherein said sectional display control means further comprises means for additionally displaying a message representative of the geographical names of both end points of the selected points.

13. An automotive navigation system according to claim 2 wherein said positional information for each of the plurality of points comprises information representative of the Longitude and the Latitude of said point.

14. An automotive navigation system according to claim 2 wherein said section setting means includes means for selecting a section defined by two adjacent ones of all of said points.

* * * * *